United States Patent Office 3,232,442
Patented Feb. 1, 1966

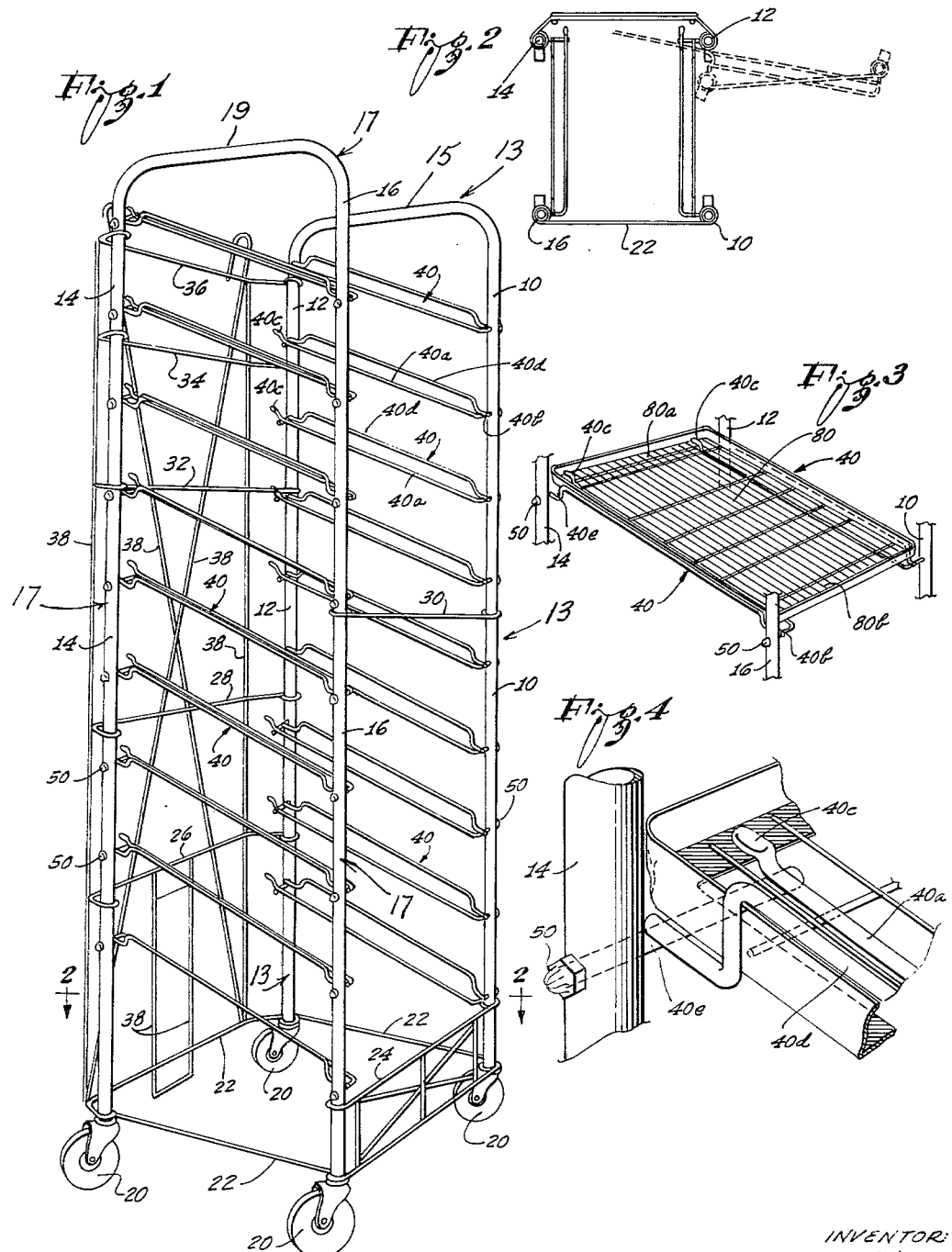

3,232,442
DISPLAY RACK
James D. Wilson, Long Beach, Calif., assignor to Banner Metals, Inc., Compton, Calif., a corporation of Ohio
Filed Sept. 2, 1964, Ser. No. 394,011
5 Claims. (Cl. 211—133)

The present invention relates to storage and display racks for use of the bakery industry, and for general use in the storage and display of loaves of bread or other bakery products, or the like; and it relates more particularly to a mobile, collapsible type of storage rack in which the merchandise is held and displayed, for example, on inclined trays.

The storage and display rack of the present invention may be used, for example, to support a plurality of trays in a stacked or tiered relationship. The trays, in turn, may support loaves of bread, or other bakery merchandise. The racks may be used for shipping mechandise from the bakery to the retail outlets; and to support and display the merchandise at the retail outlets until the mechandise is purchased by the public.

When so used, the racks of the invention are loaded at the bakery with leaves of bread, for example, or other bakery products, and they are then wheeled into trucks, or other vehicles, which are used to transport the merchandise to the markets, or other retail outlets.

At the markets, the loaded racks are wheeled off the trucks and to appropriate floor locations, at which the merchandise is displayed until it is picked up by the prospective purchasers.

The racks to be described herein are collapsible, and they may be folded flat when not in use, so that they may easily be stored in a small space, both at the market and on the trucks returning them to the bakery.

Although the racks of the invention will be described in conjunction with the bakery industry, it will be appreciated that they have general utility. That is, the improved mobile racks of the present invention have general utility in the production, storage, freezing, display and transportation of food and/or bakery products; and this utility extends to markets, bakeries, restaurants, hospitals, storage rooms, and so on.

A general object of the present invention is to provide an improved mobile collapsible rack of the above described general type, which is easy to handle, and which holds and displays the merchandise in a manner in which it is readily visible and accessible for selection by the purchasers and/or for checking and inventory purposes.

Another object of the invention is to provide such an improved storage and display rack which is light in weight and relatively inexpensive in its construction, and yet which is rugged and durable so as to be capable of withstanding rough daily usage.

Another object of the invention is to provide such an improved storage and display rack in which the spacings between the aforesaid trays is flexible, so as to provide the most efficient use of the available volume, and so as to permit the storage and display of a wide variety of bakery goods of different sizes and shapes to be realized; this objective being accomplished by the inclusion in the assembly of readily removable shelf-brackets for the aforesaid trays, as will be described.

A feature of the invention is the provision of such an improved display and storage rack which is constructed to support the aforesaid trays in a removable manner and in an inclined position without any danger of slippage, and without militating against the ease with which the trays can be removed from the assembly, so as to enhance the display capabilities of the assembly and the ease with which the merchandise in the trays can be removed therefrom.

Another feature of the invention is the provision of such an improved assembly in which the aforesaid shelf-brackets are supported in the assembly so as to be readily removable for cleaning purposes.

Other objects and features of the invention will become apparent from a consideration of the following specification, when the specification is taken in conjunction with the accompanying drawing, in which:

FIGURE 1 is a perspective elevational view of an improved storage and display rack constructed in accordance with one embodiment of the invention;

FIGURE 2 is a cross-sectional view of the assembly of FIGURE 1, taken on a reduced scale substantially on the line 2—2 of FIGURE 1, and further showing the manner in which the assembly may be folded flat, when empty;

FIGURE 3 is a fragmentary view illustrating the manner in which wire-formed trays are held in an inclined position in the assembly of FIGURE 1; and FIGURE 4 is a further fragmentary view, showing on an enlarged scale, the manner in which the shelf-brackets in the assembly of FIGURE 1 support the aforesaid trays.

The display and storage rack illustrated in the drawing includes a plurality of upright supports designated 10, 12, 14 and 16, these upright supports being apertured to receive and mount a plurality of shelf-brackets, as will be described.

The upright supports 10 and 12 are formed of a single tubular member 13; the tubular member 13 being configured into a U-shape, so that the two upright supports 10 and 12 (interconnected by an integral transverse portion 15) constitute a first pair of upright supports having a fixed spaced, parallel relationship. Likewise, the upright supports 14 and 16 (interconnected by an integral transverse portion 19) may be formed of a single U-shaped tubular member 17, so that they constitute a second pair of upright supports having a fixed spaced, parallel relationship.

A plurality of wheels 20 are mounted at the lower extremities of the upright supports 10, 12, 14 and 16. These wheels may be in the form of double ball-bearing swivel casters, and they provide mobility to the assembly.

The tubular members forming the upright supports 10, 12, 14 and 16, and other components to be described, may be composed, for example, of galvanized steel, high tensile aluminum, or any other appropriate material. A bright zinc finish may be provided, for example, when the basic construction is steel.

A rod-like retaining member 22 is wrapped around the lower extremities of the upright supports 10, 12, 14 and 16; and further rod-like retaining members 24, 26, 28, 30, 32, 34 and 36 are wrapped around respective ones of the upright supports. Rod-like supporting trusses 38 also extend between the various retaining members described above. These rod-like members serve to retain the upright supports in a spaced and parallel relationship, such as shown in FIGURE 1, when the assembly is in use; and to permit the assembly to be folded flat, such as shown by the dotted lines in FIGURE 2, when it is empty.

The assembly in FIGURE 1 includes a plurality of a wire-formed shelf-rackets 40. These brackets have an elongated configuration, and they extend between the uprights 10 and 12, and between the uprights 14 and 16. As shown in FIGURE 1, for example, the shelf-brackets 40 are mounted between the pairs of uprights in an inclined manner in the assembly.

Each of the shelf-brackets includes a first rod-like member 40a which extends along the length of the bracket, and which has a bent-over end portion 40b which extends through an aperture in the corresponding upright support, such as the support 10 in FIGURE 1.

The other end of the rod-like member 40a has a protruding portion 40c which extends, as a hook beyond the rear end of the bracket. The shelf-bracket 40 also includes a second rod-like portion 40d which extends along the length of the bracket, and which is displaced upwardly from the rod-like member 40a.

The rod-like member 40d has a U-shaped configuration, and one end of the member is welded, or otherwise affixed, to the end 40b of the rod-like member 40a. The shelf-brackets 40 also each includes a transverse member 40e which extends across the ends of members 40a and 40d and through an aperture in a further upright support, such as the support 14 in FIGURE 4, for example. The transverse member 40e is welded, or otherwise affixed, to the ends of the members 40d and 40e.

It will be appreciated, therefore, that, as shown in FIGURE 3, for example, a first series of inclined, spaced and parallel left-hand shelf-brackets 40 extends between the upright supports 14 and 16, and each of these shelf-brackets includes a transverse end portion 40b which extends through a corresponding aperture in the upright support 16, and each includes a further transevrse end member 40e which extends through a corresponding aperture in the upright support 14.

In addition, a second series of right-hand shelf-brackets 40 are supported in inclined, spaced and parallel relationship on the pair of upright supports 10 and 12, and each includes similar end portions extending through respective apertures in these two latter upright supports.

A suitable retaining nut, or cap, 50 is removably mounted on each of the protruding end portions of the shelf-brackets extending through the upright supports. These caps may be of known construction, and they include internal tines which seize the protruding ends of the above described transverse rod-like members of the shelf-brackets, so as to retain the shelf-brackets in the upright supports. The caps 50 may be removed, so as to permit the corresponding shelf-brackets to be taken out of the assembly for washing purposes, or to provide desired spacings between the trays to be supported in the assembly.

When the above-described assembly is opened to the position shown in FIGURE 1, trays such as the wire-formed tray 80 in FIGURE 3 may be supported in an inclined, tiered relationship between corresponding pairs of the shelf-brackets 40.

The trays 80, for example, may have a wire-formed bottom, with a lower flange 80a extending across the rear end of the bottom, and a lower flange 80b extending across the forward end of the bottom. The aforesaid protruding portions 40c extend up through the wire-formed bottom of the tray and engage the rim 80a of each tray, as shown in FIGURE 3, so as to securely hold the trays in their inclined position, and yet permitting the trays to be easily removed when so desired.

The invention provides, therefore, an improved assembly for holding trays in a tiered, inclined position, for the reasons stated above. The improved assembly of the invention is particularly advantageous in that it securely holds the trays in the aforesaid inclined position, without impairing the ease with which the trays may be inserted into or removed from the assembly.

The assembly of the invention is also advantageous in that its various components may be readily disassembled to permit convenient cleaning of the components.

While a particular embodiment of the invention has been shown and described, modifications may be made. The following claims are intended to cover all modifications which fall within the scope of the invention.

What is claimed is:

1. A rack assembly for supporting trays of bakery products and the like, including: a plurality of apertured upright supports; and a plurality of pairs of shelf-brackets removably mounted on corresponding pairs of said upright supports, each in an inclined position, for supporting trays in a tiered relationship and in an inclined manner, each of said shelf-brackets having an elongated wire-formed construction with a transverse rod at each end, said rods being received in apertures in corresponding pairs of said upright supports and extending through said supports, and each of said shelf-brackets having a protruding member at one end for engaging a tray to retain a tray in an inclined position.

2. Assembly defined in claim 1 and which includes removable retaining means respectively mounted on the protruding ends of said transverse rods to retain said shelf-brackets on said supports.

3. A rack assembly for supporting wire-formed trays of bakery products, and the like, each tray having a flange at the rear end of the bottom thereof, said assembly including: a plurality of apertured upright supports; means for retaining said upright supports in a mutually spaced relationship; a plurality of wheels secured to the lower extremities of said upright supports; and a plurality of pairs of shelf-brackets removably mounted on corresponding pairs of said upright supports, each in an inclined position, for supporting trays in a tiered relationship and in an inclined manner, each of said shelf-brackets having an elongated wire-formed construction with a transverse rod at each end, said rods being received in apertures in corresponding pairs of said upright supports and extending through said supports, and each of said shelf-brackets having a protruding member at one end for engaging a flange of a tray supported thereon in hook fashion from the bottom, so as to retain a tray in an inclined position.

4. The assembly defined in claim 3 in which said first-named retaining means permits said pairs of upright supports to be folded adjacent one another.

5. The assembly defined in claim 3, and which includes removable retaining means respectively mounted on the protruding ends of said transverse rods to retain said shelf-brackets on said supports.

References Cited by the Examiner

UNITED STATES PATENTS

| | | | |
|---|---|---|---|
| 682,035 | 9/1901 | Coffin | 248—243 |
| 1,052,516 | 2/1913 | Ringer | 108—109 |
| 2,362,532 | 11/1944 | Bilek | 211—126 |
| 2,928,681 | 3/1960 | Wilson | 211—126 |
| 2,936,077 | 5/1960 | Carpenter | 211—126 |
| 3,149,727 | 9/1964 | Magers | 211—148 |
| 3,153,972 | 10/1964 | Holton | 85—35 |

FOREIGN PATENTS 1,233,109   5/1960   France.

CLAUDE A. LE ROY, *Primary Examiner.*

CHANCELLOR E. HARRIS, *Examiner.*

W. D. LOULAN, *Assistant Examiner.*